United States Patent [19]

Seibel

[11] 4,027,836

[45] June 7, 1977

[54] DRAG REDUCING FAIRING FOR LANDING GEAR

[76] Inventor: Julia K. Seibel, 916 Live Oak Lane, Arlington, Tex. 76012

[22] Filed: Mar. 1, 1976

[21] Appl. No.: 662,425

[52] U.S. Cl. .......................... 244/103 R; 244/130
[51] Int. Cl.² ........................................ B64C 25/32
[58] Field of Search ............ 244/130, 102 R, 102 A, 244/103 R, 104 R; 114/235 F

[56] References Cited

UNITED STATES PATENTS 3,899,991  8/1975  Chatten et al. ................. 114/235 F

FOREIGN PATENTS OR APPLICATIONS

822,845  10/1937  France ............................... 244/130
768,934  2/1957  United Kingdom ........... 244/103 R
745,965  3/1956  United Kingdom ........... 244/103 R

Primary Examiner—Trygve M. Blix
Assistant Examiner—Charles E. Frankfort
Attorney, Agent, or Firm—Charles W. McHugh

[57] ABSTRACT

A drag-reducing construction adapted for use with a non-retractable landing gear for aircraft which includes an oleo strut and two torque links. The improvement involves placing an aerodynamically streamlined afterbody behind the cyindrical oleo strut, and the afterbody enveloping the torque links so as to shield them from the airstream during flight. The afterbody may be one-piece or several pieces, and it is rigidly attached to one or both of the torque links; it rotates out of the way when the oleo strut is stroked—such as during landing. In a specific embodiment having a relatively short stroke (e.g., approx. 5 inches), a single afterbody in the form of a hollow shell is rigidly attached to one of the torque links; and the aterbody is relatively tall so that it at least partially envelopes the other torque link. In another embodiment, two V-shaped shells are rigidly attached to the two torque links, with one of the shells being slightly narrower than the other so that it will fold within the other when the oleo strut is stroked. If mechanical interference during folding of the torque links would preclude making the entire afterbody out of rigid materials, a sponge-like body may be used for some small portions of the afterbody. The afterbody may be an appendage which is firmly attached to a respective torque link with mechanical fasteners or bonding a agent such as glue; or, the afterbody may be integrally formed with the torque link. Auxiliary fairings may be added in the vicinity of the landing gear and/or a wheel fairing to merge with the drag-reducing construction so as to provide a smooth aerodynamic surface over the entire landing gear during flight.

34 Claims, 16 Drawing Figures

DRAG REDUCING FAIRING FOR LANDING GEAR

This invention relates to non-retractable aircraft landing gear which include an oleo strut and torque links, and more particularly it relates to drag-reducing structure for forming a streamlined afterbody behind an extended oleo strut.

Aerodynamic drag on an aircraft may be defined as the aerodynamic force acting upon the aircraft along the flight path and opposite to the flight direction. This aerodynamic drag force can be conveniently divided into two additive components: induced drag and parasite drag. This invention is concerned with reducing the latter of those two.

Parasite drag serves no useful purpose in either lifting or controlling the aircaraf, and it is detrimental to aircraft performance at all air speeds. And, contrary to induced drag, its magnitude increases with increased air speed; at cruise speed or maximum speed, parasite drag is the major component of the total drag. This parasite drag is created when a portion of the air through which the aircraft flies is caused to move with the aircraft or move in the direction of the flight of the aircraft as it passes through the air. If the aircraft could slip through the air and leave the air undisturbed after it passes, then the parasite drag would be zero. However, in the real world some of the air behind the airplane will be disturbed and will have a component of velocity in the direction of flight. The time rate of change of momentum of the disturbed air in the direction of flight is equal to the parasite drag.

Airplanes built prior to 1920 were built with little regard for parasite drug; th emphasis was placed on structural considerations, and air speeds were typically 100 mph or less. The wings and tails were braced with struts and wires, and attachment fittings were exposed; landing gears were fixed and not streamlined, cockpits were open, and the engines were exposed. From 1920 to 1940 great strides were made in the art of reducing airplane drag. The biplane was replaced with the monoplane, the externally braced wings were replaced with metal cantilever wings; the external fittings were covered, the engines were cowled, and the landing gears were retracted. This improvement in the state-of-the-art evolved around the military airplanes and the early commerical airliners. World War II was thus fought with some high performance, aerodynamically clean airplanes on both sides of the conflict.

Following World War II the general aviation aircraft industry as we know it today had its beginnings. And, while the military and airline aircraft continued the aerodynamic evolution, the general aviation aircraft adopted this art slowly—no doubt because of the cost impact associated with many of the aerodyanmic improvements. In the early 1950's general aviation airplanes having significantly higher performance became commerically available. In these new airplanes, landing gears were retracted, wing struts were removed, and flush rivets were used, etc. Of course, such high performance airplanes commanded a much higher price. By way of example, it will perhaps be instructive to compare what are believed to be two equivalent aircraft made by Cessna Aircraft Company, the STATIONAIR and the CENTURION: these two airplanes could almost be twins except that the STATIONAIR has fixed landing gear and wing struts, and the CENTURION has retractable landing gear and no wing struts. The 1976 suggested manufacturers list price for the STATIONAIR was $41,850, while the list price for the high performance CENTURION was $55,950, which constitutes a price differential of about 35% for the increased speed available from the CENTURION.

Although these high performance airplanes found a viable market, the low cost models continued to find a much larger market. Thus, in 1974 there were 61,722 single-engine aircraft with fixed landing gear registered with the Federal Aviation Administration, and only 25,729 registered single-engine aircraft with retractable landing gear. Beside cost, perhaps another reason that fixed landing gear enjoyed favor over retractable landing gear is the occasional safety hazard associated with retractable gears. For example, some pilots would occasionally forget to lower the landing gear prior to landing; or the landing gear mechanism would fail, and the gear could not be extended. On such occasions substantial aircraft damage sometimes resulted during the wheels-up landing. Thus, with due consideration of both the cost and hazard of retractable gears, the fixed gear airplane has not only survived but registrations show it has been produced in much larger quantities than the retractable landing gear airplanes.

While an aircraft with non-retractable wheels might well be the only type of aircraft that a businessman feels will fit his budget, there will almost surely be an underlying desire—either some of the time or always—that the aircraft be able to fly faster. This is especially true when a businessman has selected air transportation because it is faster than ground transportation such as automobiles an trains. Other than increasing the size (and fuel consumption) of an engine, it is logical to assume that any improvement that would achieve a significant increase in speed should meet a long-felt need and should find wide acceptance. Accordingly, it is an object of this invention to improve the speed performance of an aircraft having non-retractable landing gear—by reducing the drag that normally is realized from shock absorbers and the like which are associated with such a landing gear.

It is a further object to provide a structure which is characterized by rigidity and great endurance.

Another object is to provide a structure for minimizing parasite drag behind the cylindrical strut of a non-retractable shock absorber.

One more object is to provide a novel torque link for use with non-retractable shock absorbers, wherein the torque link has an external configuration which reduces drag during flight.

These and other objects and advantages will be apparent from a reading of the specification and claims, an from examination of the drawings appended hereto, in which:

FIGS, 3, 4 and 5 are cross-sectional plan views of the device shown in FIG. 1, and taken in the planes indicated by the respective lines and numerals.

In brief, the invention may be described as a construction which is adapted for attachment to an aircraft having a non-retractable landing gear which includes an oleo shock absorber and a pair of torque links. The construction is characterized by at least one, and usually two, movable elements having a generally V-shaped or streamlined profile. The movable elements extend between fixed fairings when the oleo strut is fully extended, and they fold out of the way when the oleo strut is stroked—which occurs whenever a load is placed on the landing gear. During flight, and with the oleo shock absorber fully extended, the V-shaped members enclose the torque links and form an afterbody behind the round oleo strut which—in combination with the round strut—provides an efficient aerodynamic external shape. As to what is meant by an efficient aerodynamic shape, reference is made to the book entitled "Fluid-Dynamic Drag" by Sighard F. Hoerner published in 1965. The flow separation and parasite drag that were characteristic of the oleo strut and torque links in the prior art are therefore avoided by the invention. The general concepts of placing a streamlined afterbody behind an oleo strut an enveloping the torque links with a relatively narrow (i.e., thin) envelope during flight is adaptable to a wide variety of landing gears, including steerable and non-steerable landing gears, and those of the type commonly used by Cessna Aircraft Co. as well as those commonly used by Piper Aircraft Co. and others.

Figure 1:
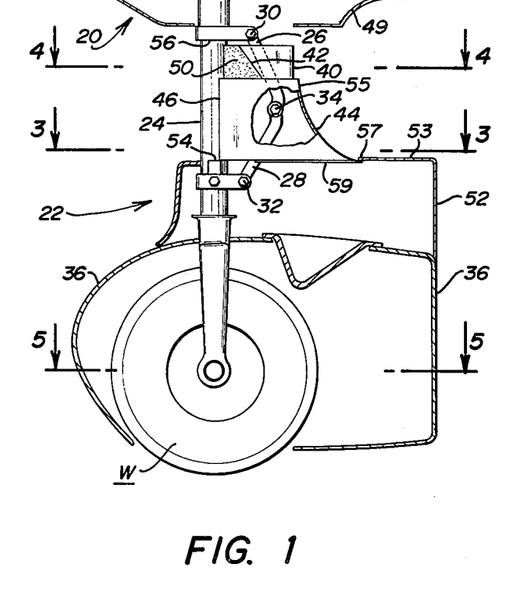
FIG. 1 is a side elevational view, partially in cross-section, of a non-retractable landing gear for an aircraft, with the oleo strut being illustrated in its fully extended mode, and including an embodiment of the invention wherein two cooperating structures combine to form a streamlined afterbody behind the oleo strut.

Referring initially to FIG. 1, an aircraft 20 has a non-retractable landing gear which includes an oleo shock absorber 22 having a strut 24 which extends between the aircraft and a wheel W. As is well known in the art, an oleo shock absorber includes one tubular member which telescopes within another member when the wheel is subjected to vertical loads, and especially shock loads such as occur during landing of the aircraft. Because the oleo strut could freely pivot about its longitudinal axis if it was to restrained in some way, two torque links 26, 28 will typically be provided to insure that the wheel W will be oriented at all times in a desired direction. The upper torque link 26 is pinned to the aircraft's upper structure with an upper pin 30, and the lower torque link 28 is pinned to some lower part of the wheel-supporting structure, as by pin 32. A connecting or wrist pin 34 joins the two torque links 26, 28 to form a folding assembly. The structure described thus far is conventional, and it will be found to be more or less the same on any aircraft with non-retractable oleo landing gear. And, the above description is generally valid for "nose" gears (which are steerable) as well as main landing gears which are not steerable.

It is also well known to attempt to reduce the drag that attends a non-retractable landing gear by placing a rigid fairing around the wheel W. Such a rigid fairing is designated in FIG. 1 by the numeral 36, and it may be of most any rigid and light-weight material, such as fiberglass or aluminum sheet metal. While wheel fairings such as fairing 36 might appear tobe very beneficial in reducing the drag associated with landing gear, it has been discovered that such wheel fairings *alone* really are not very effective—because the influence of the unprotected shock absorber disrupts the smooth air flow around the wheel fairing and thereby causes flow separation on the wheel fairing. Hence, the wheel fairing's intended usefulness is defeated. Thus, it has now been discovered that the wheel fairings that have been so widely used on landing gears with torque links have heretofore furnished essentially nothing but cosmetic benefits to the aircraft owner. In order to truly reduce the drag around a shock absorber and its associated torque links, it has been found that an aerodynamically efficient structure must also be provided behind an oleo strut—so that flow separation from a surface adjacent the shock absorber is minimized during flight. That is, when the oleo strut is fully extended (as it will be when the plane is in flight and there is no load on the wheel W), it is necessary that there be some kind of an afterbody equivalent to a V-shaped structure behind the cylindrical oleo strut. According to this invention, the exterior contours of the complete landing gear and fairings combine to constitute an efficient aerodynamic shape, as shown in the several embodiments disclosed herein.

Of course, providing the necessary streamlined afterbody behind an oleo strut would pose no problem at all if relative motion within the shock-asborbing mechanism was not necessary. But, the need to accommodate the folding action of the torque links within the limited vertical space which was available has, in the past, become an insurmountable design obtacle to the aircraft designer.

To solve the problem of providing an aerodynamically efficient structure during flight—while still permitting full stroking of the oleo strut, in one embodiment there is provided a first and generally V-shaped member 40 which is adapted to be rigidly attached to the upper torque link 26 for movement with said torque link. The V-shaped member 40 is oriented such that the open part of the V faces the oleo strut, and the breadth of said V-shaped opening its approximately the same as the diameter of the oleo strut. The height of the member 40 will normally be approximately the same as the length of the torque link 26 which it covers. and it may be slightly less, as shown in FIG. 1. The V-shaped member 40 will normally be rigidly attached to the torque link with metal clips, brackets, screws, bolts or permanent bonding. By describing the member 40 as generally V-shaped, it is intended to indicate that the member is more narrow at its trailing edge than it is at its open "mouth". Described another way, the member 40 may be said to be shaped to resemble the trailing portion of a conventional airfoil, it need not be exactly proportional to a true V, as long a it is still effective to establish a gradual change in speed of the airstream flowing thereover. As used herein, then, the expression V-shaped will be used as a shorthand way of referring to a streamlined profile that is effective in reducing the tendency of the airflow to separate from the adjacent surface as it moves from a low-pressure region to a high-pressure region.

An aditional part of the construction is a second and generally V-shaped member 44 which is adapted to be rigidly connected with the lower torque link 28 for covering the same. The leading edge 46 of member 44 may lie near the oleo strut 24. Indeed, it would even be possible for the leading edge 46 to touch the oleo strut 24 during flight; however, the machined and highly polished surface of said oleo strut 24 should be protected against the possibility of any sort of a scratch or other surface damage that might contribute to a loss of fluid as the oleo strut is stroked. Hence, when the member 44 is made of metal or some other hard material, it is preferred that there be a rubber bumper or relatively soft protective medium 48 on the leading edge of said member 44, so as to preclude any damage to the surface finish of the strut 24. While the V-shaped member 44 may extend so far forward as to overlie part of the oleo strut, the leading edge 42 of the first V-shaped member may be spaced somewhat to the rear of the oleo strut, such that a small gap is left between the oleo strut and the upper member 40. This gap may be required to avoid mechanical interference with the lower torque link when the landing gear is fully stroked. While this gap is relatively small, it is nevertheless desirable to preclude the passage of air between the oleo strut 24 and the upper member 40. One way to accomplish this would be to simply place a thin plate within the gap that separates the two members 24, 40. This would create a small cavity on both sides of the plate in which air would be trapped; this trapped air would not move (except perhaps during flight in the manner of a vortex within the cavity), so it would contribute to a generally continuous flow path for the airstream passing around and over the oleo strut 24. However, a preferred manner of dealing with this small gap is to provide an air-blocking means in the form of a sponge-like body 50 which is mounted between the member 40 and oleo strut 24. Normally, the sponge-like body 50 will be permanently attached to the member 40 so that it will move therewith as the torque links 26, 28 are foled. The exposed surfaces of the body 50 are preferably smmoth, so as to foster the easy flow of air thereover; but even providing an open cell foamed plastic would be better than simply ignoring a gap between two rigid members 24, 40. As for the thickness of said sponge-like body 50, it preferably is such that the airstream will flow smoothly past the oleo strut 24, over the body 50, and back to the V-shaped member 40, with no radical surface discontinuities at each juncture that might contribute to unwanted turbulence.

Figure 2:
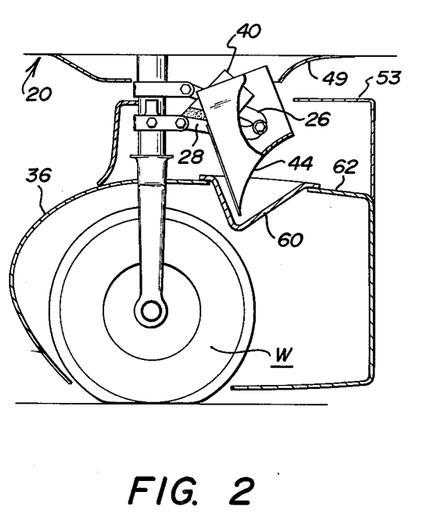
FIG. 2 is a similar view of the same structure shown in FIG. 1, except that the oleo strut has been fully stroked (or collapsed), and the torque links have been foled.
Figure 3:
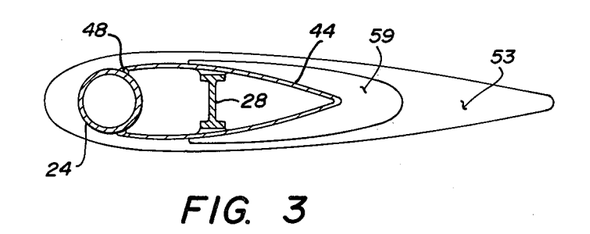
Figure 4:
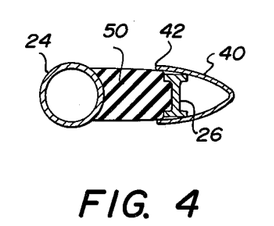
Figure 5:
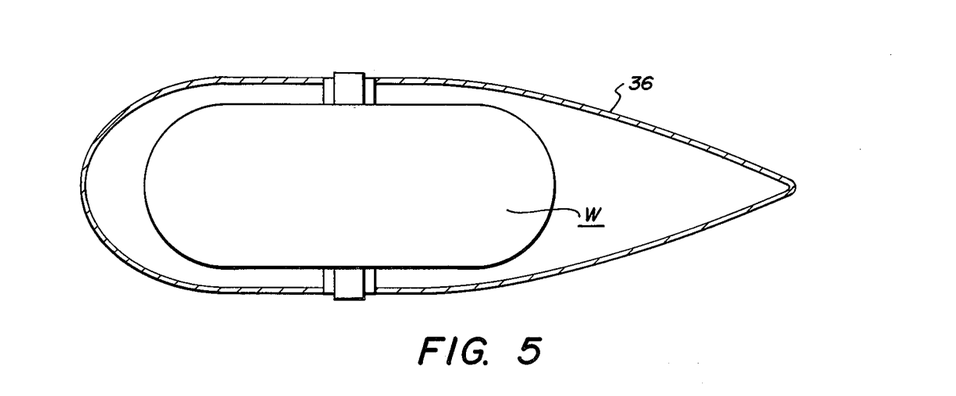

Referring next to FIG. 2, the relative position of the various parts of the drag-reducing structure are illustrated in the position they would have when the oleo strut is fully collapsed (stroked). Of course, the condition of a strut being fully collapsed would normally occur only if there had been a physical failure so tha there was no cushioning fluid left within the system—or the shock absorber had been subjected to an extremely severe and protracted load. While a complete collapse is therefore rare, the drag-reducing construction must be designed to accommodate such a possibility. As shown, the upper V-shaped member 40 has not changed its position with respect to the torque link 26; an the V-shaped member 44 is still rigidly attached to the lower torque link 28. But the two members 40, 44 have now changed their position with respect to each other, because the torque links 26, 28 are now in a folded mode. The sponge-like body 50 will have been compressed somewhat between the two torque links 26, 28, assuming said torque links having a width that would cause them to approach one another without any internal clearance space for the member 50. (That is, another way of avoiding interference between two folding torque links is to made a first link generally U-shaped and the second link relatively thin, so that the thin link could fol between the two legs of the U-shaped link. Such a configuration for torque links is *not* what is currently used on conventional torque links—but it would be feasible.) As is suggested by the position of the leading edge 42 of member 40 relative to the lower torque link 28, said leading edge is shaped so that it will never strike link 28, even when the structure is completely folded.

Of course, in order for the V-shaped members 40, 44 to assume the position shown in FIG. 2, one of them must fold within the other. And, in this particular embodiment, the upper member 40 is more narrow than the lower member 44, so that member 44 passes over member 40 as the torque links 26, 28 are foled. The reverse of this arrangement would be equally feasible, however, if there were some compelling reason for switching the relative widths shown in FIG. 2.

Another part of the multi-piece structure can be readily appreciated by comparing FIGS. 1 and 2. In FIG. 1 a static fairing 52 is provided on top of a conventional wheel fairing 36, in order to provide a streamlined body around the lower portion of the oleo strut 24. The height of this body 52 will normally be established such that it is just barely below the underside of the aircraft structure when the oleo strut is fully stroked. That is, at the time that a stop 54 makes contact with a surface 56 there will normally be a relatively small amount of clearance above static fairing 52. But, probably more significant than just its height will be the fact that the static fairing 52 has a relatively long opening in its top wall 53. The purpose for this top opening is to permit the lower member 44 to rotate downward as the torque links fold during stroking. as the member 44 rotates clockwise about pin 32, the point 55 (which is the most remote point from pin 32) must be able to clear the edge 57 of the opening in static fairing 52. Therefore, the distance from pin 32 to the nearest edge 57 of fairing 52 must be at least slightly greater than the distance from pin 32 to point 55. With regard to the width of said opening, it naturally will be wide enough to accommodate the folding torque links and any afterbody attached thereto. Of course, creating an opening in top wall 53 which is only functional during stroke introduces its own aerodynamic problem that must be met; that is, the opening must be closed during flight. This is preferably accomplished by providing a flange 59 which extends from the base of member 44 so as to merge with the top wall 53. That is, the rear-most edge of flange 59 meets edge 57 so as to effectively form a continuous surface for the airflow over static fairing 52.

Since flange 59 must be as long as it is in order to block the top opening in fairing 52 during flight, subsequently folding it during stroking of the oleo strut would cause it to interfere with a conventional wheel fairing. Therefore, a recess 60 must be formed in the wall 62 that separarates the wheel W from the space occupied by the two V-shaped members. This recess will typically be rather deep; but, of course, it must not extend so deep as to interfere with rotation of the wheel. The function of the recess 60 could be fully met by simply cutting a hole in the upper wall 62 of the wheel fairing 36; but this would permit mud and the like to be thrown upward into the space occupies by the torque links, etc. This would naturally be undesirable, and those skilled in the art would appreciate that cleanliness in the vicinity of the shock absorber 22 is especially desirable. Those skilled in the art will also know that a drain hole will be provided in the bottom of recess 60 so as to permit removal of rain water and the like.

In addition to FIGS. 1 and 2, FIGS, 3, 4 and 5 (which are cross-sectional views taken in the planes indicated in FIG. 1) have been included in order to more thoroughly identify the subject matter being disclosed herein. To enhance the clarity of the particular matter being shown in cross-section, a substantial bit of background structure has been omitted in these views, and the scale has been changed to make the views larger.

Figure 6:
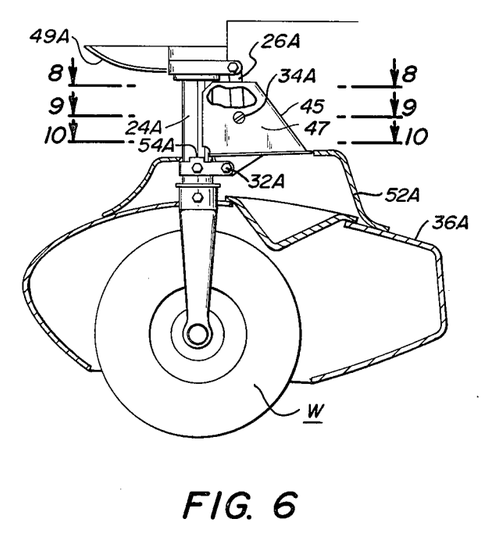
FIG. 6 is a side elevation view, partly in cross section, of another embodiment of the invention, wherein one of the torque links encloses the other torque link and constitutes a drag-reducing afterbody, with the oleo strut being shown as fully extended.

Referring next to FIG. 6, another embodiment of the invention includes a construction which is adapted to cooperate with a landing gear having a slightly different (but still aerodynamically efficient) wheel fairing. With regard to establishing an efficient profile for any of the structures referred to herein, the book "Fluid-Dynamic Drag" written by Sighard F. Hoerner and published by Dr. Hoerner in 1965 may be consulted; and the teachings therein should be considered to be incorporated herein by reference.

A new static fairing 52A is rigidly fixed to the original wheel fairing 36A above the same. This auxiliary fairing 52A extends upwardly for a distance that will usually be as high as possible, i.e., to a height approximately coincident with the top of the mechanical stop 54A. Also, the top wall of the hollow static fairing 52A has an opening which is generally round toward the front of said opening, so as to accommodate the cylindrical oleo strut; the opening is relatively thin and tapered toward the rear, so as to more nearly match the tapered profile of a movable structure that is attached to a torque link.

Unlike the embodiment shown in FIG. 1, the new rearwardly extending aerodynamic structure provided in the embodiment of FIG. 6 is a unitary piece; and it is substantially longer than the length required to merely serve as a lower torque link. Hence, it is capable of enveloping most, if not all, of the upper torque link—so that there is no need to provide an additional structure to cover the upper torque link. A construction wherein a single aerodynamic afterbody is tall enough to envelop two torque links will often be usable when the stroke of the oleo strut is relatively short, e.g., 5 inches. (When the stroke is longer than, say, seven inches, a two-piece afterbody will frequently be more advantageous.) Additionally, the structure shown in FIG. 6 illustrates another embodiment of the invention in which an integral piece 45 carries functional loads (in the manner of a torque link) and also provides an external surface which is aerodynamically efficient—in the manner described hereinabove. That is, torque link 45 operates structurally in the same manner as torque link 28 shown in FIG. 1, i.e., it prevents the unwanted rotation of an oleo strut in an aircraft landing gear. And, like torque link 28, new link 45 has a first journal for pivotable connection with the bottom of the oleo strut 24A; in FIG. 6, the pin 32A is shown in its installed position with respect to this lower journal. A second journal is also provided in the member 45 for accepting a wrist pin 34A which rotatably connects the link 45 with the upper torque link 26A. But, unlike old torque link 28, new structural link 45 has a functional *exterior* surface 47. This exterior surface 47 is integral with and supported by the underlying rigid structure, and it has a configuration which is adapted to provide a streamlined body behind the oleo strut 24A when said strut is in a fully extended position. Too, the movable exterior surface 47 extends to upper and lower locations where it effecitvely merges with adjacent static surfaces to form an aerodynamically efficient structure below the aircraft when the oleo strut is fully extended. At its lower edge, the exterior surface 47 merges smoothly with the aformentioned top opening of fairing 52A. At its top edge, the exterior surface 47 extends to the vicinity of a static fairing 49A that merges smoothly with a major part of the aircraft. And, as with the V-shaped shell 44 of FIG. 1, the rear-most edge of link 45 has a clean aerodynamic shape.

Figure 7:
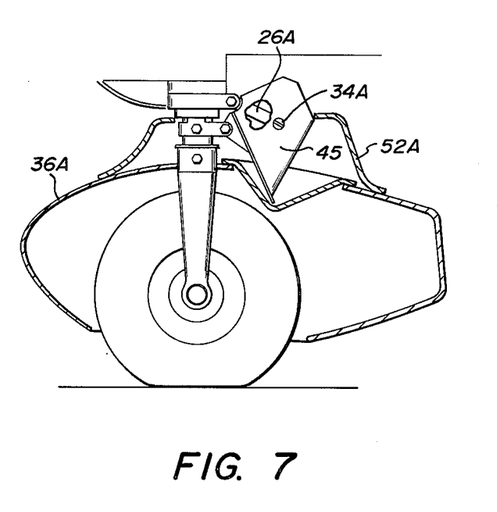
FIG. 7 is a view of the same structure shown in FIG. 6, with the oleo strut being shown as fully stroked.
Figure 8:
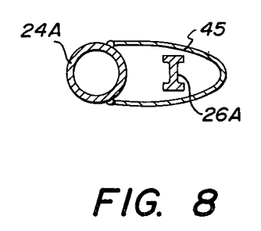
FIGS. 8, 9 and 10 are fragmentary cross-sectional plan views of the construction shown in FIG. 6, with the views being taken in the planes indicated by the respective section lines, and a substantial part of the lowermost structure being omitted for clarity.
Figure 9:
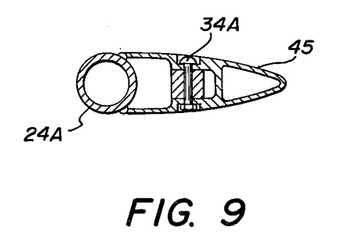
Figure 10:
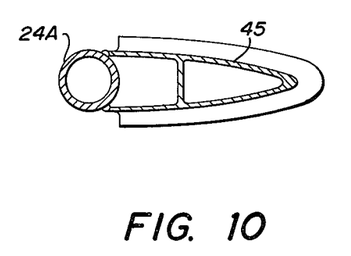

FIG. 7 illustrates the embodiment of FIG. 6 wherein the oleo strut has been fully collapsed, such as might happen if all of the air and liquid had beem removed from the strut. FIGS. 8, 9 and 10 are comparable to FIGS. 3, 4 and 5 in that they shown, in part, cross-sectional views of the drag-reducing structure taken the planes indicated by the respective lines in FIG. 6.

While the single-piece embodiment shown in FIS. 6 and 7 is illustrated as a "lower" torque link, it should be understood that the concept of having one exterior shell extend far enough to cover two torque links would be adaptable in such a way that the shell is firmly carried by the upper troque link rather than the lower one. In other words, the concept which is significant here is that a streamlined afterbody be firmly secured to a movable torque link so as to move (i.e., rotate) with the same. And, whether that afterbody is attached to the upper or lower torque link is actually immaterial, as long as it serves to at least partially cover the torque link that it is not directly connected to. Furthermore, it is probably appropriate to mention here that the concept of an integral member (having both a rigid structure with first and second journals for pivotable connection with other elements, and also an exterior surface which forms a streamlined afterbody) would be appropirate for any of the embodiments shown herein. Thus, instead of affixing two separate pieces such as pieces 28, 44 (or pieces 26, 40) with appropriate fastening means in order to create the combinations shown in FIG. 1, it would be entirely appropriate for those combinations to be integrally formed as single pieces.

Figure 11:
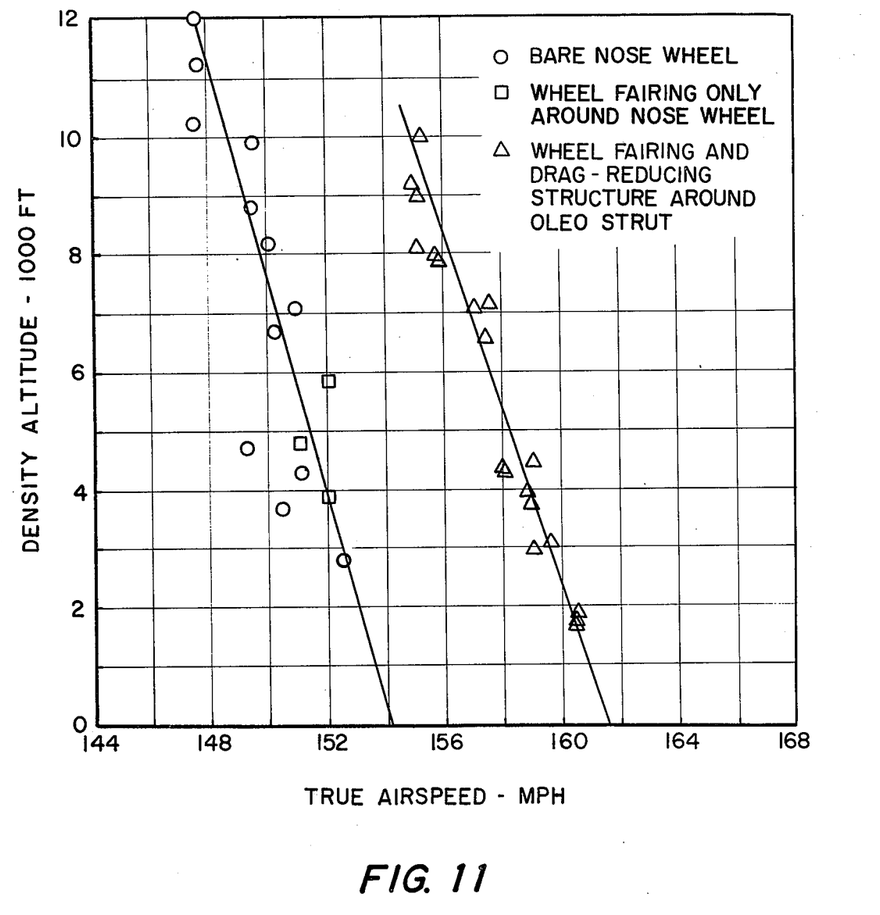
FIG. 11 is a plot of performance data for a modified Cessna 172, which shows that an improvement of about 7 m.p.h. is realizable from use of the invention described herein.

Both the embodiments of FIG. 1 and FIG. 6 have been shown as applied to landing gear that can be found on presently manufactured Cessna aircraft. And, before explaining exactly how the invention might be applied to other aircraft, perhaps it would be appropirate at this time to support a statement that was made earlier in this disclosure that there are advantages to be realized from shielding the torque links, etc., on the nose wheel from the airstream and prop wash. To this end, attention is now directed to FIG. 11 which depicts experimental data taken with a modified Cessna 172, Ser. No. 47,622, manufactured in 1960. The data indicated by the circles reflects performance with a bare nose wheel. Of course, a bare nose wheel will be recognized by those skilled in the art as being somewhat less than ideal—as compared with a theoretically efficient body. Hence, one might guess that placing wheel fairings or "pants" around the exposed nose wheels would contribute to a reduction of drag on aircraft which would be manifested as an immediate increase in air speed for a given throttle setting. Somewhat surprisingly, this is not the case—as can be seen by examining the data represented by triangles which depicts performance with the addition of only a wheel fairing around the nose wheel. (The remaining two wheels of the tricycle landing gear to not have shock absorbers, and hence their wheel fairings are not related to the problem being solved by this invention.) Thus, the data for a nose wheel with a fairing will be seen to the statistically equivalent to the data for a bare nose wheel. it seems that a fair conclusion to be drawn from this series of tests is that the unprotected torque links and the exposed oleo strut (with its cylindrical exterior) interferes with the air flows as to render essentially negligible any benefit that may be realized from a wheel fairing alone. However, when the oleo strut and the torque links are enveloped within an aerodynamically efficient housing such as that disclosed herein, an immediate increase in air speed is realizable for the same throttle setting. In FIG. 11, the squares indicate experimental data wherein a wheel fairing on the nose wheel was combined with the drag-reducing structure of the invention behind the oleo strut. It will be seen that an increase in true air speed of approximately 7 m.p.h. has been accomplished by virtue of letting the accelerated boundary layer air sweeping past the oleo strut decelerate over an elongated surface, as well as shielding the torque links from the airstream. All of these tests were conducted over an altitude range commensurate with low atmospheric turbulance conditions, an with a take-off gross weight of 1850 pounds; the tests were made with the engine at full throttle, and with engine rpm at 2400. Also, for the benefit of those who are familiar with the normal performance of a Model 172 as it comes from the factory, it should perhaps be added that a substantial bit of streamlining had already been accomplished with this particular aircraft before the modification to the nose wheel was made. For a comment on the previous drag-reduction modifications to Ser. No. 47,622 see page 59 of the September, 1973 issue of *Flying*. Also, a change in engine type was made before any of the data of FIG. 11 was taken.

While an increase of 7 m.p.h. (without increasing the engine's power) may sound impressive to those who fly, there is perhaps another— and more dramatic—way of measuring the impact of this invention. First of all, let it be remembered that the invention is primarily adapted for improving the performance of small aircraft with fixed landing gear. In 1974, there were 61,722 single-engine aircraft with fixed landing gear registered with the Federal Aviation Administration, which was about 56% of the total fleet of "general aviation" aircraft registered with the FAA. Also, FAA records show that there were some 31,250,000 hours flown in 1974 by "general aviation" aircraft. If the drag-reducing structure disclosed herein had been incorporated on all of the other 61,721 aircraft with non-retractable landing gear, and if they had flown 56% of the total hours flown, and if the average improvement on those additional aircraft had been the same as the improvement realized with the described Cessna 172, then this invention would have saved 5,837,000 gallons of fuel and 55,890 hours of flying time—to travel the same total distance. Examined in this way, it should be obvious that a mere 7 m.p.h. improvement in true air speed can produced rather dramatic results.

Having described a drag-reducing construction for use with one type of landing gear, attention will now be directed to a similar installation on landing gear of a substantially different type, namely, gear of the type which may be found on the main wheels of a Piper Cherokee 180. Such wheels are not steerable, and the shock-absorbing oleo strut for such a wheel lies alongside the wheel, rather than being above the same. Thus, the bottom portion of such an oleo strut for main wheels will be found to connect directly to a stub axle on which the wheel is mounted. Besides the drag-inducing torque links, the main wheels on a Cherokee 180 have hydraulic brakes which are actuated through hydraulic hoses which typically lie in an arc behind the shock absorber and torque links.

In adapting the invention to an aircraft of the Cherokee type, it is advantageous to again use a multi-piece aerodynamic structure which is attached to and carried by the landing gear. In the embodiment in FIG. 12, a first member 70 is rigidly connected to a lower torque link 28B for rotation therewith. The forward edge 72 of member 70 has a width which is substantially the same as the diameter of the oleo strut of said landing gear; and, said forward edge extends far enough forward when the oleo strut is fully extended as to be essentially tangent to the surface of said oleo strut 24B. That is, the forward portion of member 70 partially covers the cylindrical oleo strut, leaving the frontal portion of said oleo strut exposed to the airstream during flight. Since it is desired that the airstream flow smoothly over the oleo strut 24B and immediately back to the tapered member 70, it is advantageous for the forward edge 72 to be as close as possible to the cylindrical strut 24B. But, it must be remembered that said cylindrical strut 24B is machined and highly polished, and its surface finish must be protected. Accordingly, a resilient bumper 74 is advantageously affixed to at least a portion of the front edge 72, so that the polished cylindrical surface will not be scratched by a rigid member 70. An appropriate material for this member (which also serves as a seal) is silicon rubber. Of course, as long as an aerodynamic structure like hollow member 70 does not carry any substantial loads, it could be made of a material having some inherent resilience—such as hard rubber. However, a thin, rigid material like fiberglass for member 70 and a narrow bumper 74 will generally be preferred—because of weight considerations if nothing more.

Figure 12:
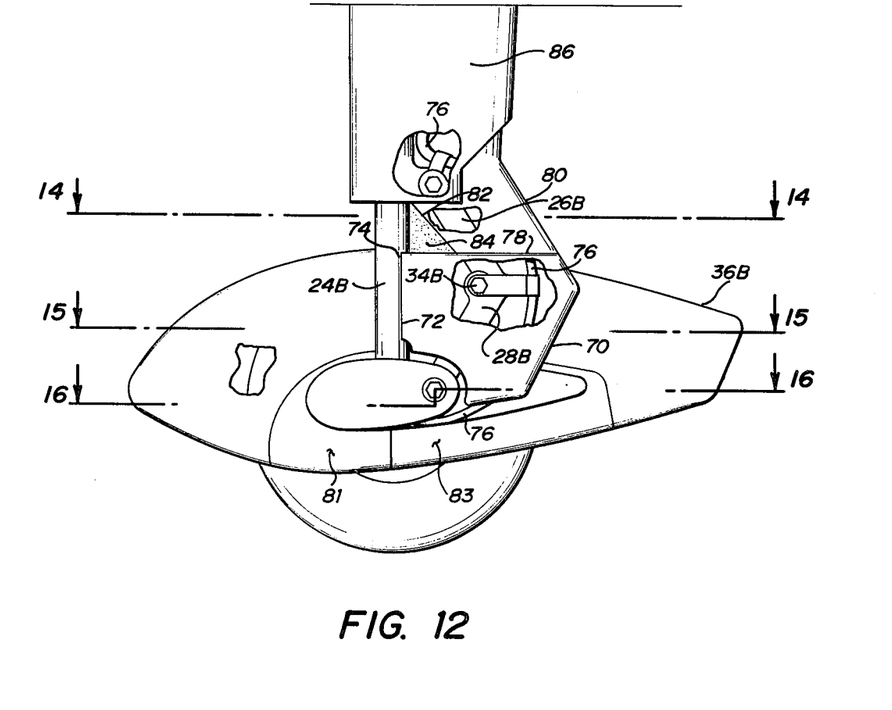
FIG. 12 is a side elevation view of still another embodiment of the invention, wherein in oleo strut extends alongside a wheel fairing rather than above the same.

It will be noted that the rear-most edge of the member 70 extends backward to a point significantly behind the hydraulic line 76, so that there is no likelihood of any rubbing action between said hydraulic line and the interior of member 70. The top edge 78 of member 70 extends well above the wrist pin 34B that connects the two torque links. At a region where the member 70 terminates, an upper member 80 begins, so that there is essentially a continuous surface from the wheel strut fairing 86 down to the vicinity of the stub axle. The leading edge 82 of member 80 does not extend as far forward as does the leading edge 72, because a certain amount of clearance is necessary between the members 28B, 80 when they are folded. Hence, there will be a triangular gap between leading edge 82 and the oleo strut 24B. This gap is advantageously filled with a resilient, sponge-like material 84 such as polyurethane foam. As a further part of the over-all drag-reduction program, it will usually be advisable to add some additional coverings for the lower portion of the wheel fairing; such coverings 81 and 83 are shown in FIG. 12.

Figure 13:
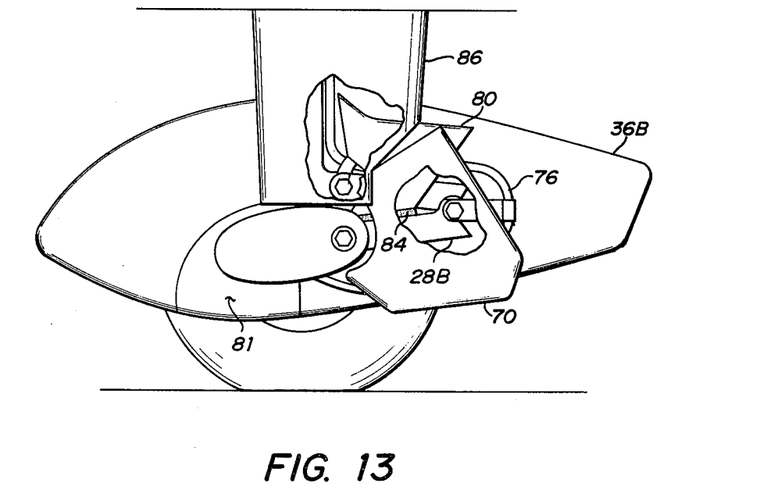
FIG. 13 is a view of the same structure shown in FIG. 12, with the oleo strut being shown in its fully stroked condition.

Referring next to FIG. 13, the relative position of the moving parts of the multi-piece structure may be clearly seen. In this view, the member 80 has rotated downward and into member 70, while at the same time member 70 has rotated clockwise along with its associated torque link 28B. The hydraulic line 76 may be seen to be in a position where there is no risk of any structure rubbing against the line or otherwise risking interference that might produce some physical damage.

Figure 14:
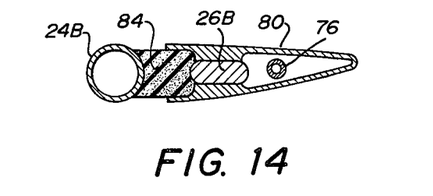
FIGS. 14, 15 and 16 are fragmentary cross-sectional plan views of the construction shown in FIG. 12, with the views being taken in the planes indicated by the respective section lines, and some of the structure being omitted for clarity.
Figure 15:
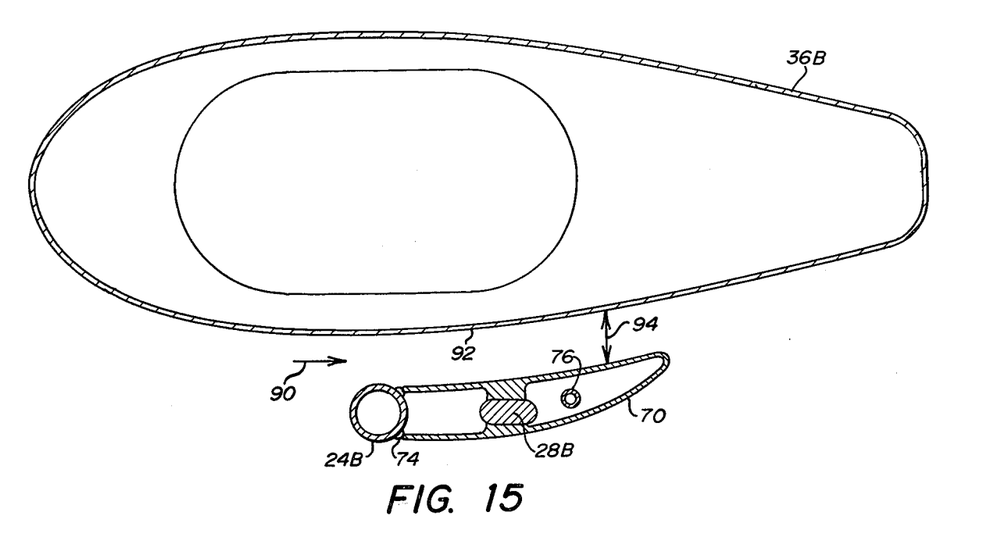
Figure 16:
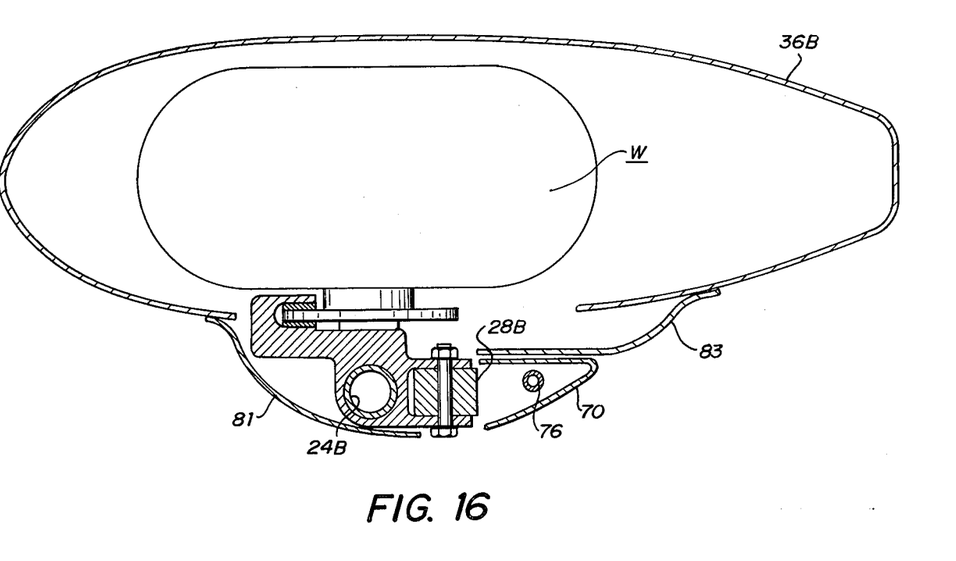

Referring next to FIG. 14, the relative positions of the oleo strut 24B, the new tapered member 80 and the new sponge-like body 84 may be seen. Said body 84 is fixed to member 80, and it only bears against oleo strut 24B when the structure is in its extended mode. It will also be seen that member 89 is not symmetrical, although it is still tapered in such a way that it constitutes an aerodynamically streamlined body. The reason that member 80 is not symmetrical can probably be more fully appreciated when a person examines FIG. 15, which shows aerodynamic member 70 adjacent the wheel fairing 36B. In order that the airstream moving backward in the vicinity of arrow 90 will not be subjected to separation and/or turbulance as it passes between the sligthly convex wall 92 and the inside surface of member 80, it is advisable that the separation distance represented by arrow 94 remain fairly consistent from the front edge of member 80 to the trailing edge thereof. Hence, the surface of member 80 which faces the wheel fairing should be approximately parallel to that portion of the wheel fairing surface immediately opposite it. Above the wheel fairing the necessity for maintaining a "matching" concave surface does not exist, and a gradual transition to a symmetrical shape will be usually appropriate in order to preclude any abrupt change in the drag-reducing structure as it connects with the fixed wheel strut. At the level represented by FIG. 14, the tapered member 80 has been converted about half-way from a slightly skewed cross-section to a symmetrical cross-section. Regardless of the orientation of any of the members described herein, the general statement may be made that they are gentle in contour and without any abrupt changes in section; and, as a group they are intended to foster gradual air expansion past the position of maximum thickness so as to avoid air flow separation or stall.

While the specific embodiments disclosed herein have only been described as being usable on Cessna and Piper aircraft, it is not thereby intended to slight any of the other manufacturers of fine aircraft. However, by describing how the invention is employed on two substantially different landing gears, it should now be apparent to those skilled in the art the concepts disclosed herein could be employed with a non-retractable landing gear of substantially any type. Furthermore, it should be apparent that certain modifications to and deviations from the configurations disclosed herein could be made—without departing from the spirit and scope of the invention. Therefore, the configurations disclosed herein as preferred embodiments should be considered as exemplary and not as limiting. For example, it should be apparent that the frontal portion of an aerodynamic afterbody may be open like the "mouth" of a V; or it may be more nearly closed, having only a cusp-like recess which matches the cylindrical surface of an oleo strut. Additionally, the exact profile of a tapered afterbody may be varied over a substantial range while still preserving the characteristics that inhibit separation of the airstream flowing thereover. Similarly, the exact materials from which the drag-reducing afterbodies are made may be varied at will, although it is assumed that they will usually have the structural characteristics of fiberglass. Accordingly, the invention should be considered as limited only by the scope of the claims appended hereto.

What is claimed is:

1. A construction adapted for cooperation with an aircraft landing gear which includes an oleo shock absorber and two torque links, comprising:
   a. a first and generally V-shaped member for rigid attachment to the upper one of the two torque links for movement with the upper torque link; and
   b. a second and generally V-shaped member for rigid attachment to the lower one of the two links for movement therewith, and both of said V-shaped members extending rearwardly from the oleo strut to form a streamlined afterbody behind said oleo strut when the strut is fully extended, whereby parasite drag associated with the shock absorber may be reduced.

2. The construction as claimed in claim 1 and further including airblocking means which includes a ponge-like body mounted between a V-shaped member and the oleo strut, with the exterior of said sponge-like body essentially continuing the contour between the oleo strut and the V-shaped member so as to guide the airstream gently backward from the oleo strut to said member, with said sponge-like body also being collapsible so as not to inhibit the folding of said torque links.

3. The construction as claimed in claim 2 wherein the two V-shaped members are rigid and the area of the sponge-like body which is exposed to the airstream in a flying circuit is appreciably less than the exterior portions of the first and second V-shaped members, such that the bulk of the construction which is exposed to the airstream is rigid.

4. The construction as claimed in claim 1 wherein one of the V-shaped members is slightly narrower than the other member, and the narrow member folds within the other when the oleo strut is stroked.

5. The construction as claimed in claim 1 and further including a static fairing member for mounting adjacent the lower V-shaped member, with said static fairing member being adapted to merge with a wheel fairing so as to form an aerodynamically efficient surface over the complete landing gear when the oleo strut is fully extended.

6. The construction as claimed in claim 1 and further including an aerodynamic wheel fairing which surrounds most of the wheel, and there being a recess in the top of the wheel fairing which is sized to accommodate a portion of the lower V-shaped member when the oleo strut is stroked to a fully collapsed position and the torque links are folded.

7. The construction as claimed in claim 1 and further including blocking means lying between the oleo strut and the torque links, for blocking the flow of air between the oleo strut and at least one of the torque links during flight.

8. The construction as claimed in claim 1 wherein said first and second V-shaped members are sized so that one will fold within the other when the oleo strut is stroked.

9. The construction as claimed in claim 1 wherein a static fairing is provided adjacent the oleo strut, and said fairing has a bottom opening for receiving at least a portion of a V-shaped member when the oleo strut is fully stroked.

10. Apparatus comprising the combination of:
 a. an aircraft having non-retractable landing gear with both an oleo shock absorber for the wheel carried by said gear and torque links for orienting said wheel; and
 b. a rigid and multi-piece structure attached to and carried by the landing gear, with said structure having an extended mode wherein it lies around the torque links duringflight when the shock absorber is fully extended, and said structure also having a folded mode when the aircraft is on the ground and the shock absorber is at least partially stroked, and said structure comprising an afterbody adapted to rest immediately behind the oleo strut during flight in such a way that, an exposed forward portion of the oleo strut and the exterior portion of the afterbody combine to produce a streamlined configuration for reducing flow separation around the shock absorber and torque links during flight.

11. The apparatus as claimed in claim 10 wherein an upper piece of said multi-piece structure is rigidly attached to one torque link, and a lower piece of said structure is rigidly attached to another torque link, and wherein the upper and lowerpieces rotate with the torque linkes when the shock absorber is stroked.

12. The apparatus as claimed in claim 10 and further including a shaped opening in the top of a wheel fairing to accommodate a portion of the multi-piece structure when it is folded, and also including a cover plate for closing said opening during flight.

13. The apparatus as claimed in claim 10 and further including a static fairing attached to the aircraft above the torque links, with said fairing having a recess in the bottom thereof for accommodating a movable piece of the multi-piece structure when the shock absorber is stroked.

14. The apparatus as claimed in claim 10 wherein the maximum width of the multi-piece structure is about the same as the diameter of the oleo strut in said shock absorber, and the length of the multi-piece structure is several times longer than the diameter of said oleo strut.

15. The apparatus as claimed in claim 10 wherein said multi-piece structure lies mostly behind and only partially alongside the oleo strut of said shock absorber, such that the frontal portion of said oleo strut is subjected to the airstream during flight.

16. The apparatus as claimed in claim 10 and further including a resilient bumper affixed to at least a portion of the front edge of said afterbody, and said resilient bumper being soft enough to preclude surface damage to the polished surfaces of the shock absorber when the resilient bumper contacts the same.

17. A combination which serves as a torque link for preventing the unwanted rotation of an oleo strut in an aircraft landing gear, comprising:
 a. a rigid structure sized so as to accommodate the type of torque loads that are characterisitc of an aircraft torque link, and having a first journal for pivotable connection with one end of an oleo strut of an aircraft landing gear, and having a second journal for pivotable connection to another torque link; and
 b. a V-shaped exterior surface rigidly supported by said rigid structure and extending for an appreciable distance behind a line that joins the two journals, with said exterior surface being adapted to provide an aerodynamically streamlined afterbody immediately behind the oleo strut which contributes to an aerodynamically efficient structure below the aircraft when the oleo strut is fully extended, and the frontal opening between leading edges of the V-shaped exterior surface being no wider than the diameter of the oleo strut, and the top and bottom ends of the V-shaped exterior surface being shaped so as to merge with complementary fairings around other parts of the landing gear.

18. The combination as claimed in claim 17 wherein the height of said exterior surface is substantially greater than the distance between the first and second journals, such that the exterior surface extends beyond at least one of the journals for an appreciable distance, whereby said exterior surface may partially envelope another torque link so as to reduce the drag thereabout.

19. The combination as claimed in claim 17 wherein the rigid structure and the exterior surface are two separate pieces that are firmly joined together with a fastening means.

20. The combination as claimed in claim 17 wherein the rigid structure and the exterior surface are intergrally formed as one piece.

21. The combination as claimed in claim 17 an further including resilient means mounted along the leading edges of the V-shaped exterior surface to insure a close fit between the oleo strut and said exterior surface without risking damage to the polished surface of said oleo strut.

22. The method of reducing drag around a non-retractable landing gear during flight, with the landing gear having an oleo strut and two torque links, comprising the steps of:
 a. rigidly attaching to at least one of the torque links a structure which is movable with said torque link, with said structure having an exterior surface which is substantially longer than the width of said torque link but not substantially thicker than the space occupied by said torque link, and said exterior surface being relatively wide and close fitting to the oleo strut at its front and being tapered to a narrow width toward the rear, so as to combine with an exposed forward portion of the oleo strut to form a streamlined shape in order to minimize drag during flight; and
 b. providing static fairings adjacent the movable structure, with said static fairings effectively merging with said movable structure in order to provide aerodynamically efficient surfaces around the entire landing gear during flight.

23. The method of reducing drag as claimed in claim 22 including the step of leaving at least the front half of the oleo strut exposed to the airstream during flight, and extending the streamlined exterior surface far enough forward so that a portion of the airstream flows smoothly off of the extended oleo and onto said streamlined exterior surface, whereby the adverse effects of air flowing completely around a cylindrical oleo strut are avoided.

24. The method of reducing drag as claimed in claim 22 and including the further step of preventing structural interference at such time as the oleo strut is stroked by folding one part of said torque link structure within another part of said torque link struture, with said folding being about an axis that coincides with the journal between the two torque links.

25. The method of reducing drag as claimed in claim 22 and including the further step of preventing structural interference at such time as the oleo strut is stroked by folding one part of said torque link structure downward into a static wheel fairing which envelops the wheel carried by the oleo strut.

26. A drag-reducing construction adapted for cooperation with a non-retractable aircraft landing gear, with said gear having an oleo shock absorber and two vertically arranged torque links associated with the oleo strut, comprising:
   a. a first, aerodynamically tapered member having means for rigid attachment to the upper one of two torque links, and there being a cusp-like opening along the forward portion of the member, with said cusp-like opening facing the oleo strut when said tapered member is attached to the torque link;
   b. a second, aerodynamically tapered member having means for rigid attachment to the lower one of the two torque links, and said first and second tapered members being sized so that one will fold within the other when the oleo strut is stroked, and said second member having a cusp-like opening which faces the oleo strut when said member is attached to the lower torque link, with the external surfaces of both first and second members extending forwardly to a position near the oleo strut when said strut is fully extended so as to foster streamlined air flow to the rear of an extended oleo strut; and
   c. flexible means lying between at least one of the tapered members and the oleo strut when the strut is fully extended, so as to seal any air gaps between the oleo strut and an adjacent tapered member.

27. The construction as claimed in claim 26 and further including a static fairing sized to extend between a wheel fairing carried by the landing gear and the bottom edge of the lower tapered member, with the external surface of said static fairing merging smoothly with both the wheel fairing and the tapered member, such that separation of the air flow over the landing gear during flight will be inhibited.

28. The construction as claimed in claim 26 and further including a wheel fairing carried by the landing gear, with an upper wall separating the wheel from the space occupied by the two tapered members, and said upper wall including a recess which accommodates at least a portion of the second tapered member when the torque links are folded.

29. The construction as claimed in claim 26 wherein the second tapered member has a portion which lies alongside an adjacent wheel fairing, and the external surface of the tapered member which faces the wheel fairing is configured so as to provide a non-separating flow path for the air passing between the tapered member and the wheel fairing.

30. The construction as claimed in claim 29 wherein the wheel fairing has a slightly convex shape in the region near the second tapered member, and the exterior surface of said tapered member which immediately faces the wheel fairing is slightly concave in order that the distance between the tapered member and the wheel fairing will be nearly constant.

31. The construction as claimed in claim 26 wherein the flexible means constitutes a sponge-like cellular body which is affixed to and carried by the first tapered member.

32. The construction as claimed in claim 26 and further including a static fairing which extends upwardly from a wheel fairing to the lower part of the position occupied by the second tapered member during flight, with said static fairing having a top opening which is large enough to accommodate the second tapered member when the torque links are folded, and said top opening being closed by the bottom portion of the second tapered member when the oleo strut is fully extended.

33. The construction as claimed in claim 26 wherein the tapered members are made of light-weight and rigid material having the structural characteristic of fiberglass.

34. The construction as claimed in claim 33 wherein the frontal edges of at least one of said tapered members are parallel to the longitudinal axis of the oleo strut when the strut is fully extended, and said frontal edges lie immediately next to the oleo strut when it is extended, and wherein said flexible means includes a rubber bumper affixed to each of the frontal edges so that a rigid member cannot directly contact a polished surface on said oleo strut.

* * * * *

UNITED STATES PATENT OFFICE
CERTIFICATE OF CORRECTION

Patent No. 4,027,836     Dated June 7, 1977

Inventor(s) Julia K. Seibel

It is certified that error appears in the above-identified patent and that said Letters Patent are hereby corrected as shown below:

In the Abstract, line 14, "aterbody" should read --afterbody-- ; line 25, "bonding a" should read --a bonding-- . Column 1, line 17, "aircaraf" should read --aircraft-- ; line 34, "drug; th" should read --drag; the-- . Column 2, line 32, "an" should read --and-- ; line 54, "an" should read --and-- ; line 65, "foled" should read --folded-- . Column 3, line 18, "in" should read --an-- ; line 67, "to" should read --not-- . Column 4, line 19, "tobe" should read --to be-- ; line 47, "asborbing" should read --absorbing-- . Column 5, line 6, "a" should read --as-- ; line 14, "aditional" should read --additional-- ; line 54, "foled" should read --folded-- ; line 55, "smmoth" should read --smooth--. Column 6, line 1, "tha" should read --that-- ; line 9, "an" should read --and-- ; line 19, "made" should read --make-- ; line 21, "fol" should read --fold--; line 34, "foled" should read --folded-- . Column 7, line 16, "occupies" should read --occupied-- . Column 8, line 26, "aformentioned" should read --aforementioned-- ; line 34, "beem" should read --been-- ; line 36, "shown" should read --show-- ; line 39, "FIS." should read --FIGS.-- ; line 44, "troque" should read --torque-- ; line 68, "appropirate" should read --appropriate-- . Column 9, line 21, "to" should read --do-- ; line 24, "the" should read --be-- ; line 25, "it" should read --It-- ; line 29, "flows" should read --flow-- ; line 46, "an" should read --and--. Column 11, line 39, "sligthly" should read --slightly-- ; line 67, "art the" should read --art that the-- . Column 12, line 26, "fo" should read --for-- ; line 38, "ponge-" should read --sponge--- ; line 49, "circuit" should read --aircraft-- . Column 13, line 40, "lowerpieces" should read --lower pieces-- ; line 41, "linkes" should read --links-- . Column 14, line 7, "characterisitc" should read --characteristic-- ; line 42, "an" should read --and-- . Column 15, line 6, "oleo and" should read --oleo strut and-- ; line 14, "struture" should read --structure-- .

UNITED STATES PATENT OFFICE
CERTIFICATE OF CORRECTION

Patent No. 4,027,836  Dated June 7, 1977

Inventor(s) Julia K. Seibel

It is certified that error appears in the above-identified patent and that said Letters Patent are hereby corrected as shown below:

Column 3, line 51, "an", second occurrence, should read -- and --. Column 16, line 42, "characteristic" should read -- characteristics --.

Signed and Sealed this

*Eighteenth* Day of *October 1977*

[SEAL]

*Attest:*

RUTH C. MASON  
*Attesting Officer*

LUTRELLE F. PARKER  
*Acting Commissioner of Patents and Trademarks*